Patented May 22, 1945

2,376,708

UNITED STATES PATENT OFFICE 2,376,708

STEROIDAL ACID COMPOUNDS AND METHOD OF OBTAINING THE SAME

Russell Earl Marker, State College, Pa., and Eugene L. Wittle, Detroit, Mich., assignors to Parke, Davis & Company, Detroit, Mich., a corporation of Michigan No Drawing. Application August 3, 1940, Serial No. 351,146

6 Claims. (Cl. 260—397.1)

This invention relates to steroidal acid compounds and methods of obtaining the same.

Accordingly, an object of this invention is the preparation of steroidal acid compounds having utility in the preparation of pharmaceutical substances.

Another object of this invention is to afford a new and useful method for obtaining steroidal acid compounds having utility in the preparation of pharmaceutical substances.

A further object of this invention is to prepare etio-cholanic acids from pregnane compounds by methods giving high yields.

Other objects of this invention will be discerned on perusal of this specification and the appended claims.

For the preparation of pharmaceutical substances such as the sex and cortical hormones it is often necessary to make use of etio-cholanic acid derivatives. These have the following formulae:

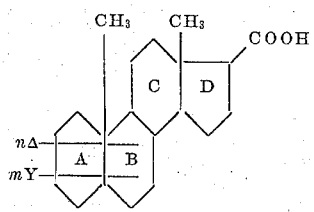

where the symbol $n\Delta$ represents $n$ carbon-to-carbon double bonds in the A—B portion of the steroid nucleus, $n$ having one of the values 0, 1, 2 and 3, and where the symbol $m$Y represents $m$ substituents in the A—B portion of the steroid nucleus, said substituents being selected from the class consisting of hydroxyl and groups hydrolyzable to hydroxyl, and $m$ having one of the values 0, 1, 2 and 3, the sum of $m$ and $n$ not exceeding the value 3. By substituents hydrolyzable to hydroxyl, we mean such substituents as —O—acyl, —O—aralkyl, and halogen.

Hitherto these etio-cholanic acid derivatives have been obtained, but only in poor yields, by various methods which depend on the oxidation of pregnane derivatives. According to the present invention a new method is employed for the preparation of these etio-cholanic acid derivatives in high yields.

In practicing our invention we proceed as follows.

As a starting material we use a 20-keto-pregnane compound representable by the formula

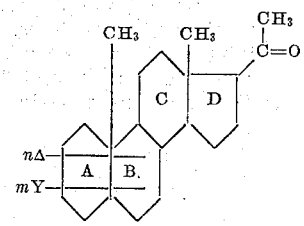

where the symbol $n\Delta$ represents $n$ carbon-to-carbon double bonds in the A—B portion of the steroid nucleus, $n$ having one of the values 0, 1, 2 and 3, and where the symbol $m$Y represents $m$ substituents in the A—B portion of the steroid nucleus, said substituents being selected from the class consisting of hydroxyl and groups hydrolyzable to hydroxyl, and $m$ having one of the values 0, 1, 2 and 3, the sum of $m$ and $n$ not exceeding 3.

The requirement that the sum of $m$ and $n$ should not exceed the value 3 is based on practical considerations, for while it is relatively easy to obtain or prepare pregnane compounds of this type from suitable sources such as urines, sterols, bile acids, and sapogenins, the obtainment or preparation of pregnane compounds more highly substituted in the A—B portion of the nucleus is generally relatively difficult.

A 20-keto-pregnane compound of the above indicated type is condensed with an aldehyde or an aliphatic ketone to give an intermediate condensation product of the following formula

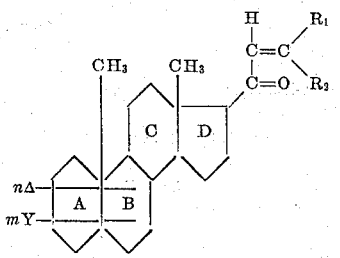

where the symbol $n\Delta$ represents $n$ carbon-to-carbon double bonds in the A—B portion of the steroid nucleus, $n$ having one of the values 0, 1, 2 and 3, where the symbol $m$Y represents $m$ substituents in the A—B portion of the steroid nucleus, said substituents being selected from the class consisting of hydroxyl and groups hydrolyzable to hydroxyl, and $m$ having one of the values 0, 1, 2 and 3, the sum of $m$ and $n$ not exceeding the value 3; where $R_1$ is a member of the class consisting of aliphatic hydrocarbon radicals and hydrogen, and where $R_2$ is a member of the class consisting of alkyl, aralkyl, and aryl. For practical reasons, arising from the fact that of ketones, those of the aliphatic series such as acetone, methyl ethyl ketone, and the like operate best in the practice of our invention, we limit $R_2$ to alkyl radicals when $R_1$ is an aliphatic hydrocarbon radical.

These condensation products we call 21-alkylidene-20-keto-pregnane compounds. To prepare the etio-cholanic acids any group in rings A and B such as —OH groups, which ordinarily readily oxidize, are first intermediately protected against oxidation by treatment with a halogenating, acylating or alkylating agent. Likewise, nuclear double bonds are protected by addition of hydrogen halide or halogen. Then the nuclearly protected 21 - alkylidene-20-keto-pregnane compounds are oxidized, preferably at higher temperatures such as 50–100° C., with a strong oxidizing agent, such as an oxidizing agent selected from the group of compounds of hexavalent chromium and heptavalent manganese, thereby forming etio-cholanic acid derivatives.

This may be illustrated by the preparation of etio-lithocholic acid from pregnanol-3-($\alpha$)-one-20 according to the following equations:

Our invention may be further illustrated by the following examples:

Example 1

(a) To a solution of 1.0 g. of pregnanol-3-($\alpha$)-one-20 and 500 mg. of benzaldehyde in 25 cc. of absolute ethyl alcohol is added at 25° and with shaking a solution of 600 mg. of sodium in 15 cc. of absolute alcohol. After the mixture has stood for about 20 minutes at 25–30° C. crystalline material is formed throughout the solution. The mixture is allowed to stand, however, undisturbed for twenty-four hours and then is diluted with ether and shaken vigorously with dilute hydrochloric acid. The ethereal layer is separated and washed well with water and dilute potassium carbonate solution. On evaporating most of the ether the product crystallizes and after cooling it may be filtered off and washed with ether. The yield is about 1.1 g. of 21-benzal-pregnanol-3-($\alpha$)-one-20 of melting point 228–230° C. The product may be readily crystallized from ethyl alcohol and when thus purified melts at 230–232° C. It is sparingly soluble in acetone and ether. The mother liquor can be concentrated to give a further quantity of the same compound.

The acetate of 21-benzal-pregnanol-3-($\alpha$)-one-20 may be prepared by refluxing 1 g. of the parent substance with 12 cc. of acetic anhydride for half an hour. Then the solution is evaporated

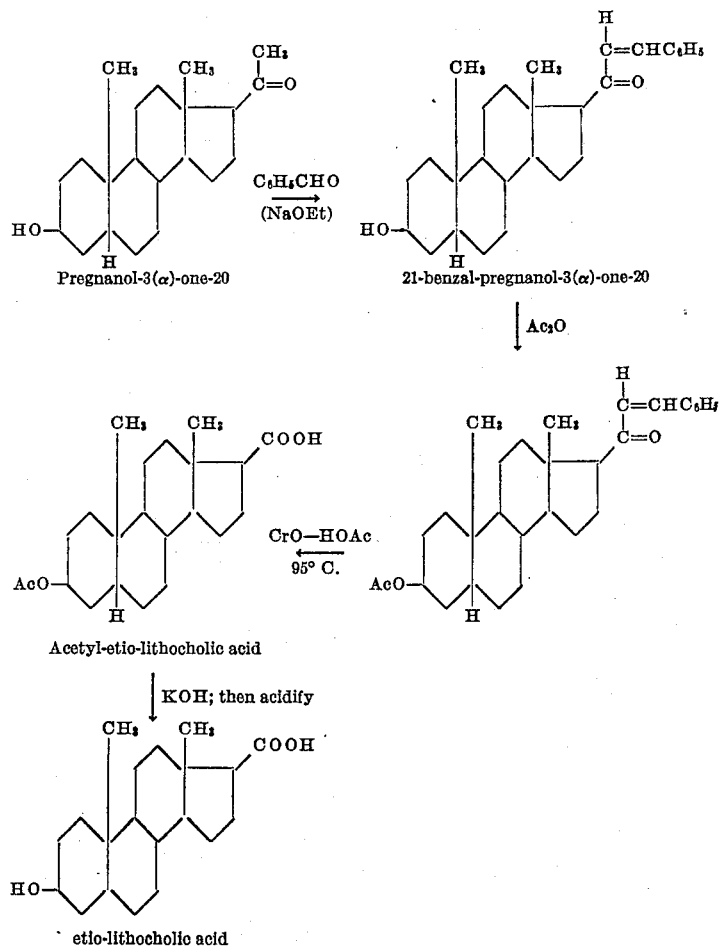

to dryness in vacuo and the residue crystallized from acetone. The acetate is crystallized as thick plates from acetone. It melts at 152° C.

(b) To a solution of 800 mg. of 21-benzal-pregnanol-3-($\alpha$)-one-20 acetate of melting point 152° C. in 100 cc. of glacial acetic acid at 50° is added with stirring, over a period of half an hour, a solution of 1.5 g. of chromic anhydride in 5 cc. of water and 50 cc. of acetic acid. The solution is stirred at 50–70° C. for 5 hours and then 20 cc. of alcohol is added to destroy the excess chromic anhydride. The solution then is concentrated in vacuo to 25 cc., diluted with water and the mixture extracted with ether. The ethereal layer is separated, washed several times with water and then extracted with dilute potassium carbonate solution. The aqueous potassium carbonate extracts are combined, acidified with hydrochloric acid and the precipitated acid extracted with ether. The ethereal solution thus obtained is washed with water and evaporated to dryness and the crystalline residue recrystallized from dilute methanol to give acetyl-etio-lithocholic acid of melting point 226–228° C. The mother liquor contains benzoic acid of melting point 120–122° C. Since acetyl-etio-lithocholic acid is not a very strong acid it is not completely extracted from ethereal solution by means of potassium carbonate solution. Accordingly the ethereal layer from the above potassium carbonate extract is evaporated to dryness and the residue crystallized from acetone to yield the same acetyl-etio-lithocholic acid of melting point 230–232° C. The amount of acid thus obtained from the ethereal phase is about eight times as great as that obtained from the potassium carbonate phase. The total yield approximates 70%.

(c) A solution of 50 mg. of the acetyl-etio-lithocholic acid, prepared as described above in 30 cc. of 2% alcoholic potassium hydroxide solution is heated to refluxing for one-half hour. Then it is poured into 200 cc. of water and this solution made acid with dilute hydrochloric acid. The white solid acid which precipitates is extracted with ether and the ethereal solution washed with water and evaporated to a small volume, whereupon the acid crystallizes. The acid is recrystallized from acetone to give etio-lithocholic acid of melting point 275–278° C.

(d) This acid may be oxidized at 20° by treatment with an equal weight of chromic anhydride in acetic acid to give 3-keto-etio-cholanic acid of melting point 246–249° C.

*Example 2*

(a) To a solution of 1.0 g. of pregnanol-3-($\beta$)-one-20 acetate and 500 mg. of benzaldehyde in 15 cc. of absolute alcohol is added a solution of 600 mg. of sodium in 45 cc. of alcohol. In about fifteen minutes crystals are formed throughout the solution. The solution, however, is allowed to stand for twenty-four hours undisturbed. Then it is diluted with ether and washed with dilute hydrochloric acid. The ethereal layer is separated, washed with water and dilute sodium carbonate solution and evaporated almost to dryness. The product which crystallizes from the ether is collected and washed with ether to give the crude product which has the melting point of 172–175° C. After several recrystallizations from acetone the pure 21-benzal-pregnanol-3-($\beta$)-one-20 is obtained as white crystals of melting point 179° C.

During the course of the above condensation, the 3-acetoxy group is hydrolyzed. To prepare the acetate of 21-benzal-pregnanol-3-($\beta$)-one-20 the parent compound is refluxed with about 15 times its weight of acetic anhydride for about half an hour. Then the solution is evaporated to dryness under reduced pressure and the residue is crystallized from acetone. In this manner there is obtained the acetate of 21-benzal-pregnanol-3-($\beta$)-one-20 as crystals of melting point 175° C. This depresses with the parent benzal compound to 150–155° C. showing their non-identity.

(b) The acetate of 21-benzal-pregnanol-3-($\beta$)-one-20 may be oxidized in a manner similar to that described in Example 1 to give 3-($\beta$)-hydroxy-etio-cholanic acid. The purified product after hydrolysis and crystallization from dilute acetone has a melting point of 229–230° C. When treated with ethereal diazomethane it forms a methyl ester which after crystallization from dilute acetone or methanol melts at 138–142° C. The 3-($\beta$)-hydroxy-etio-cholanic acid may be treated with pyridine and acetic anhydride and worked up in the known manner to give the anhydride-acetate of melting point 188–190°.

(c) Under mild conditions of oxidation 3-($\beta$)-hydroxy-etio-cholanic acid may be oxidized to give 3-keto-etio-cholanic acid identical with that obtained by oxidizing 3-($\alpha$)-hydroxy-etio-cholanic acid (etio-lithocholic acid). This shows that the 3-hydroxy-etio-cholanic acid of this example and Example 1 are epimeric about C–3.

To a solution of 300 mg. of 3($\beta$)-hydroxy-etio-cholanic acid in 50 cc. of acetic acid at 20° is added a solution of 200 mg. of chromic anhydride in 20 cc. of 95% acetic acid. The solution is allowed to stand at room temperature for one hour and then is diluted with water and the product extracted with ether. The ethereal solution is washed thoroughly with water and evaporated to dryness. The residue is crystallized from acetone to give 3-keto-etio-cholanic acid of melting point 245–248° C.

(d) To a solution of 300 mg. of 3-keto-etio-cholanic acid in 5 cc. of acetic acid at 18° is added 2 drops of 48% hydrobromic acid and then 2 cc. of 0.5 molar bromine in acetic acid. The bromine is added dropwise and the addition requires a period of ten minutes. Then the solution is diluted with water and the precipitated material collected and dried. After crystallization from dilute acetone the pure 4-bromo-3-keto-etio-cholanic acid of melting point 202–204° C. is obtained.

(e) A solution of 200 mg. of 4-bromo-3-keto-etio-cholanic acid in 5 cc. of dry pyridine is refluxed for six hours. Then the solution is evaporated to dryness under reduced pressure and the residue dissolved in a mixture of ether and dilute hydrochloric acid. The ethereal layer is separated, washed well with water and evaporated to dryness. The residue is crystallized from acetone to give 3-keto-$\Delta^4$-etio-cholanic acid of melting point 240–245° C.

*Example 3*

(a) To a solution of 500 mg. of epi-allo-pregnanol-3-one-20 and 600 mg. of benzaldehyde in 30 cc. of absolute ethyl alcohol is added at 25° a solution of 700 mg. of sodium dissolved in 15 cc. of absolute ethyl alcohol. After the mixture has stood at room temperature for 24 hours it is poured into water and the mixture extracted with ether. The ethereal layer is separated and shaken with dilute hydrochloric acid and then with water. The ethereal extract is evaporated to dryness to leave an oily residue which resists crystallization. This is the 21-benzal-allo-pregnanol-3-(α)-one-20.

(b) This oil is dissolved in acetic anhydride and refluxed for one hour. Then it is evaporated to dryness under reduced pressure and the residue dissolved in 100 cc. of acetic acid. To this solution at 95° C. is added with stirring a solution of 2 grams of chromic anhydride in 50 cc. of 95% acetic acid. After the solution has stood at 95° for two hours it is diluted with water and extracted with ether. The ethereal layer is separated and washed with water and dilute sodium bicarbonate solution, and then with 5% potassium hydroxide solution. The potassium hydroxide extract is heated on the steam bath for one-half hour, cooled, acidified and extracted with ether. The ethereal extract thus obtained is evaporated to dryness and the residue crystallized repeatedly from dilute methanol to give 3-(α)-hydroxy-etio-allo-cholanic acid of melting point 282–285° C.

On treatment with acetic anhydride and pyridine there is obtained from this 3-(α)-hydroxy-etio-allo-cholanic acid a compound which is apparently an acetate-anhydride. It may be crystallized from methanol to a constant melting point of 208–210° C.

Instead of using a 3-hydroxy-pregnanone-20 compound according to these examples one may substitute other analogous compounds such as the 3-enol-ethers of progesterone, 3-chloro-pregnanone-20, or $\Delta^5$-pregnenol-3-(β)-one-20 to obtain the corresponding benzal derivative. In each case these compounds may be oxidized according to the method given in the above example to obtain the etio-cholanic acid derivative. For example, there is obtained by the oxidation of the 3-enol ethyl ether of 21-benzal progesterone, the 3-enol ethyl ether of 3-keto-$\Delta^4$-etio-cholenic acid. Likewise, there is obtained from the 21-benzal derivative of 3-chloro-pregnanone-20, on oxidation with chromic acid at 95° C., the 3-chloro-etio-cholanic acid. Again the benzal derivative of $\Delta^5$-pregnenol-3-(β)-one-20 may be oxidized with chromic acid at elevated temperature, with intermediate protection of the 3—OH group by acetylation and of the double bond by addition of bromine, to give the 3-(β)-hydroxy-$\Delta^5$-etio-cholenic acid.

The above examples illustrative of our invention are capable of a number of variations in regard to the reagents and conditions employed, and these variations will be apparent to those skilled in the art, in view of this disclosure. Accordingly we do not wish our invention to be limited to any specific embodiment of this invention.

For example, instead of using benzaldehyde in the condensation to form the 21-alkylidene compounds we may use other aldehydes or reactive lower aliphatic ketones such as acetaldehyde, trimethylacetaldehyde, anisaldehyde, isovaleraldehyde acetone, ethylmethyl ketone, diethyl ketone and the like. Also instead of using sodium ethylate or a solution of sodium in alcohol as the alkaline condensing agent we may use other alkaline condensing agents such as sodamide, potassium ethylate, potassium methylate, sodium metal in ether, and other combinations selected from the class consisting of alkali metals and the amides and alcoholates thereof. Instead of using chromic anhydride in acetic acid as an oxidizing agent we may use the combination of potassium dichromate in sulfuric acid, or potassium permanganate in sulfuric acid, or other combinations employing oxidizing agents selected from the group of compounds of hexavalent chromium and heptavalent manganese. For protecting nuclear hydroxyl groups, we may use acylating agents such as acetic anhydride, phthalic anhydride, benzoyl chloride and the like. Or we may use alkylating agents such as benzyl chloride, triphenylmethyl chloride, or other etherifying agents. Again we may protect nuclear hydroxyl groups by temporary halogenation with a reagent such as phosphorus pentachloride or thionyl chloride, subsequently removing the chlorine atom by hydrolysis as for example by refluxing the halo-etio-cholanic acid derivative with potassium acetate in acetic acid.

It is apparent that our invention also embodies a new group of substances which we designate as 21-alkylidene-20-keto-pregnane compounds. These have the formula:

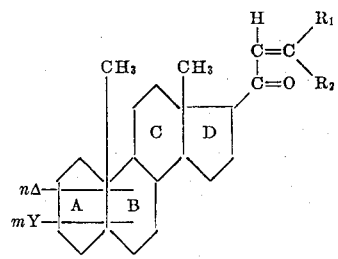

where the symbol $n\Delta$ represents $n$ carbon-to-carbon double bonds in the A—B portion of the steroid nucleus, $n$ having one of the values 0, 1, 2 and 3, where the symbol $mY$ represents $m$ substituents in the A—B portion of the steriod nucleus, said substituents being selected from the class consisting af hydroxyl and groups hydrolyzable to hydroxyl, and $m$ having one of the values 0, 1, 2 and 3, the sum of $m$ and $n$ not exceeding the value 3; where $R_1$ is a member of the class consisting of aliphatic hydrocarbon radicals and hydrogen, and where $R_2$ is a member of the class consisting of alkyl, aralkyl, and aryl and where $R_1$ is an aliphatic hydrocarbon radical, $R_2$ is alkyl.

What we claim as our invention is:

1. The process of preparing steroidal acid compounds which comprises condensing a 20-keto-pregnane compound with a member of the group consisting of aldehydes and reactive lower aliphatic ketones in the presence of an alkaline condensing agent thereby forming a 21-alkylidene-20-keto-pregnane compound, oxidizing said 21-alkylidene-20-keto-pregnane compound with intermediate protection of groups in the steroid nucleus, said oxidation being carried out at 50 to 100° C. with an oxidizing agent selected from the class consisting of compounds of hexavalent chromium and heptavalent manganese thereby forming an etio-cholanic acid derivative, removing the protecting groups, and isolating the etio-cholanic acid derivative.

2. The process of preparing steroidal acid compounds which comprises condensing a 20-keto-pregnane compound of the formula

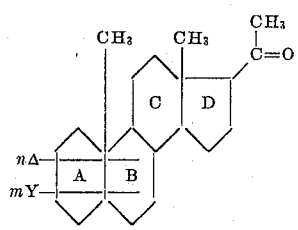

where the symbol $n\Delta$ represents $n$ carbon-to-carbon double bonds in the A—B portion of the steroid nucleus, n having one of the values 0, 1, 2 and 3, and where the symbol mY represents m substituents in the A—B portion of the steroid nucleus, said substituents being selected from the class consisting of hydroxyl and groups hydrolyzable to hydroxyl, m having one of the values 0, 1, 2 and 3, the sum of m and n not exceeding the value 3, with a member of the group consisting of aldehydes and lower reactive aliphatic ketones in the presence of an alkaline condensing agent thereby forming a 21-alkylidene-20-keto-pregnane compound, oxidizing said 21-alkylidene-20-keto-pregnane compound with intermediate protection of groups in the steroid nucleus, said oxidation being carried out at 50 to 100° C. with an oxidizing agent selected from the class consisting of compounds of hexavalent chromium and heptavalent manganese thereby forming an etio-cholanic acid derivative, removing the protecting groups and isolating the etio-cholanic acid derivative.

3. The process of preparing steroidal acid compounds which comprises condensing a 20-keto-pregnane compound with an aromatic aldehyde in the presence of an alkali metal alcoholate thereby forming a 21-alkylidene-20-keto-pregnane compound, protecting any nuclear hydroxyl groups by treatment with an acylating agent, and protecting any nuclear double bonds by treatment with a reagent selected from the class consisting of hydrogen halides and halogens, oxidizing said protected 21-alkylidene-20-keto-pregnane compound with chromic acid at 50 to 100° C. thereby forming an etio-cholanic acid derivative, removing the protecting groups and isolating the etio-cholanic acid derivative.

4. The process of preparing steroidal acid compounds which comprises condensing a compound of the formula

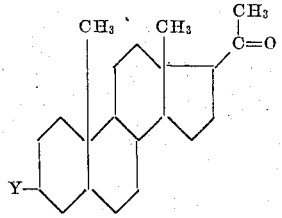

where Y is selected from the class consisting of —OH and —O—acyl, with an aromatic aldehyde in the presence of an alkali metal alcoholate thereby forming a compound of the formula

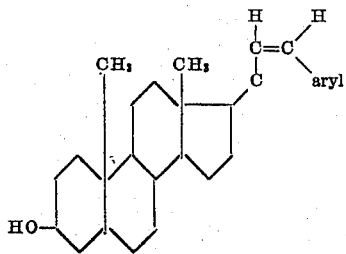

protecting the nuclear hydroxyl group by treatment with an acylating agent, oxidizing said protected compound with chromic acid at 50 to 100° C. thereby forming a 3-acyloxy-etio-cholanic acid, removing the acyloxy group by hydrolysis, and isolating the 3-hydroxy-etio-cholanic acid.

5. The process of preparing steroidal acid compounds which comprises condensing a compound of the formula

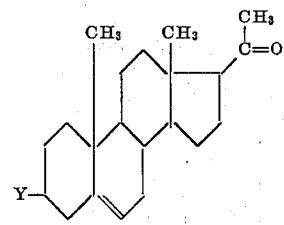

where Y is selected from the class consisting of —OH and —O—acyl, with an aromatic aldehyde in the presence of alkali metal alcoholate thereby forming a compound of the formula

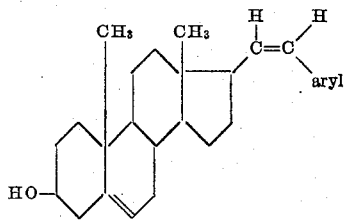

protecting the nuclear hydroxyl group by treatment with an acylating agent, and protecting the nuclear double bond by treatment with a reagent selected from the class consisting of hydrogen halides and halogens, oxidizing said protected compound with chromic acid at 50 to 100° C. thereby forming an etio-cholanic acid derivative, removing the protecting groups, and isolating the 3-hydroxy-$\Delta^5$-etio-cholenic acid.

6. The step of oxidizing a 21-alkylidene-20-keto-pregnane compound with intermediate protection of groups in the steroid nucleus, said oxidation being carried out at 50 to 100° C. with an oxidizing agent selected from the class consisting of compounds of hexavalent chromium and heptavalent manganese thereby forming an etio-cholanic acid derivative.

RUSSELL EARL MARKER.
EUGENE L. WITTLE.